(12) United States Patent
Jagannathan et al.

(10) Patent No.: US 8,312,066 B2
(45) Date of Patent: Nov. 13, 2012

(54) HASH COLLISION RESOLUTION WITH KEY COMPRESSION IN A MAC FORWARDING DATA STRUCTURE

(75) Inventors: Rajesh Jagannathan, Oakland, CA (US); Brian Alleyne, Los Gatos, CA (US); Ramanathan Lakshmikanthan, Santa Clara, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 165 days.

(21) Appl. No.: 12/957,301

(22) Filed: Nov. 30, 2010

(65) Prior Publication Data

US 2012/0136889 A1    May 31, 2012

(51) Int. Cl.
  *G06F 15/173* (2006.01)
(52) U.S. Cl. .......................... 707/899; 709/242; 726/13
(58) Field of Classification Search .................. 707/899; 709/242; 726/13
  See application file for complete search history.

(56) References Cited

U.S. PATENT DOCUMENTS

| | | | |
|---|---|---|---|
| 6,434,662 B1 | 8/2002 | Greene et al. | |
| 6,675,163 B1 * | 1/2004 | Bass et al. | 1/1 |
| 6,910,118 B2 * | 6/2005 | Kagawa | 711/216 |
| 7,085,271 B2 * | 8/2006 | Gooch | 370/392 |
| 7,085,275 B2 * | 8/2006 | Chen et al. | 370/395.32 |
| 7,089,326 B2 * | 8/2006 | Boucher et al. | 709/242 |
| 7,290,281 B1 * | 10/2007 | McGrew | 726/23 |
| 7,346,059 B1 * | 3/2008 | Garner et al. | 709/242 |
| 7,565,343 B2 * | 7/2009 | Watanabe | 1/1 |
| 7,712,130 B2 * | 5/2010 | Reamer | 726/11 |
| 7,760,719 B2 * | 7/2010 | Yik et al. | 370/389 |
| 7,827,218 B1 * | 11/2010 | Mittal | 707/899 |
| 2011/0026403 A1 * | 2/2011 | Shao et al. | 370/235 |

FOREIGN PATENT DOCUMENTS

WO    9829986 A1    7/1998

OTHER PUBLICATIONS

G. Trotter, Terminology for Forwarding Information Base (FIB) based Router Performance, Network Working Group, Request for Comments: 3222, Dec. 2001, 16 pages.
Donald E. Knuth, The Art of Computer Programming, vol. 3, Sorting and Searching, Second Edition, Copyright 1998 by Addison Wesley Longman, pp. 513-558.

\* cited by examiner

*Primary Examiner* — Jorge A Casanova
(74) *Attorney, Agent, or Firm* — Blakely Sokoloff Taylor & Zafman, LLP

(57) ABSTRACT

Embodiments of the invention include a method performed in a media access control (MAC) forwarding control module within a network element for looking up a MAC address and interface (I/F) identifier pair (MAC-I/F pair) from a MAC forwarding data structure that comprises a first tier data structure and a plurality of second tier data structures. The MAC forwarding data structure utilizes compressed keys to index each of the plurality second tier data structures. The compressed key is generated with a desired MAC address and a mask bit list that corresponds with enough bit positions such that all MAC addresses in second tier data structure can be uniquely addressed with just the values of each MAC address in the bit positions listed. As such, the MAC forwarding data structure is constructed so that the total cost of a lookup with the compressed key technique is deterministic and, therefore, O(1).

10 Claims, 5 Drawing Sheets

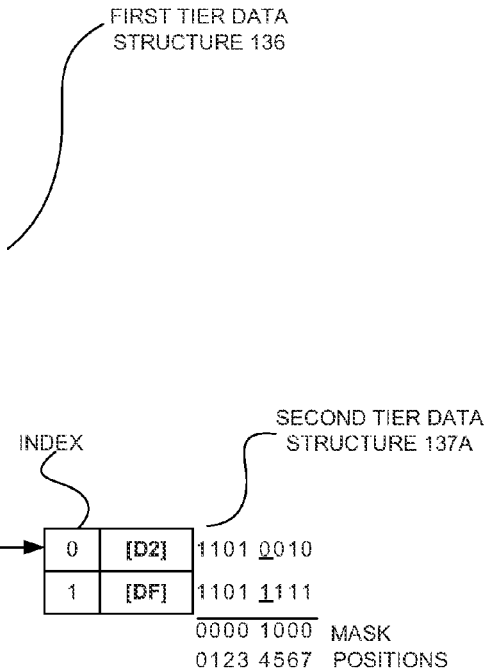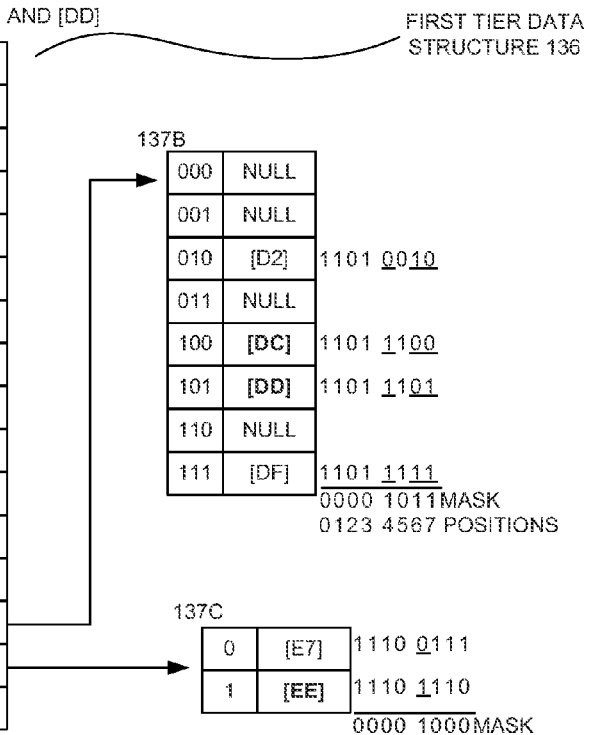
FIGURE 2

FIGURE 4
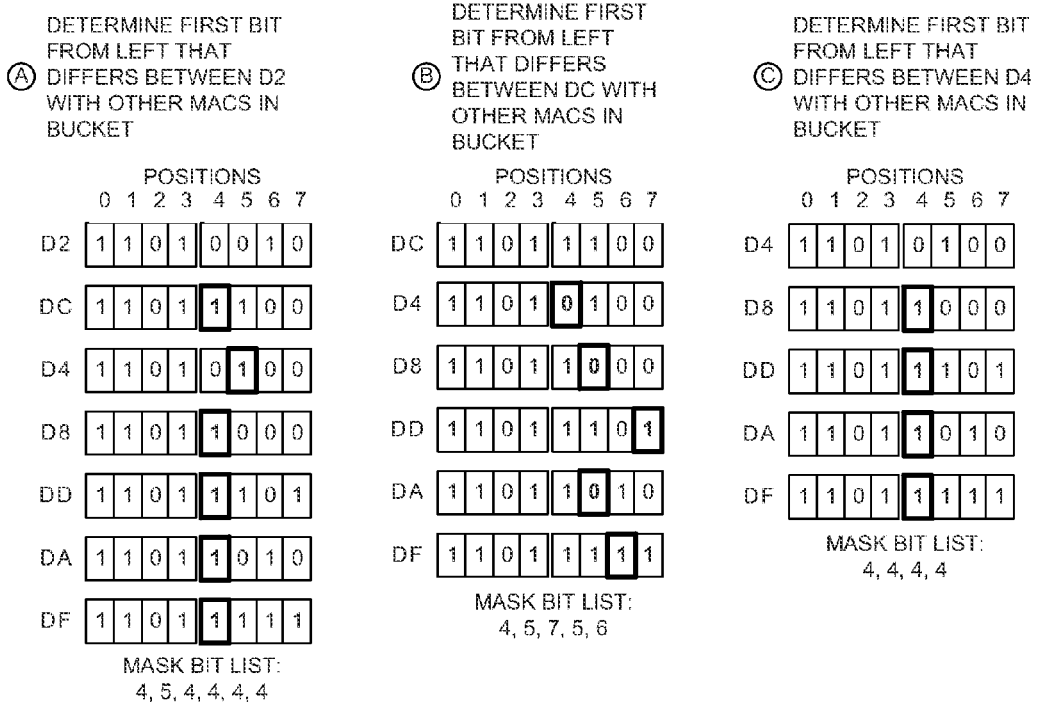
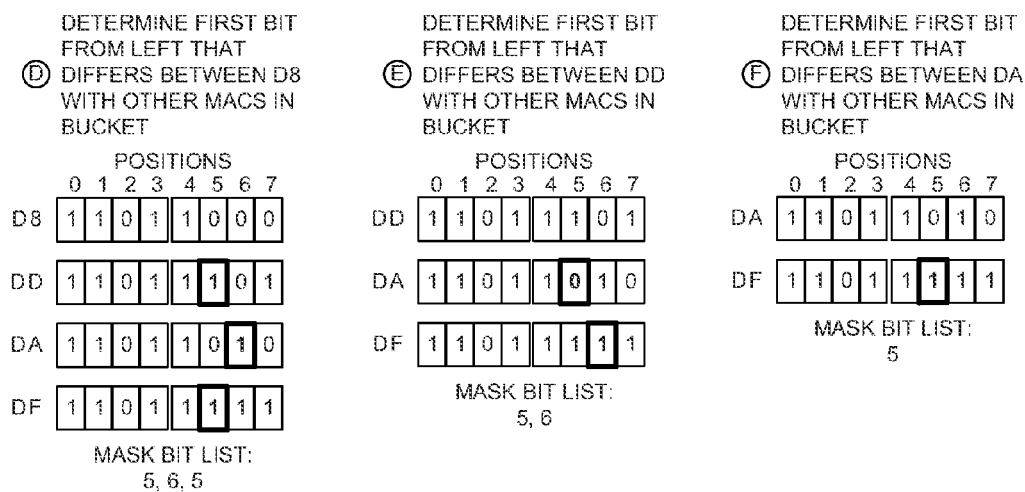

HASH COLLISION RESOLUTION WITH KEY COMPRESSION IN A MAC FORWARDING DATA STRUCTURE

FIELD OF THE INVENTION

Embodiments of the invention relate generally to the field of hash tables and more particularly storing entries in a MAC forwarding data structure.

BACKGROUND

In network elements a media access control (MAC) forwarding data structure (also referred to as a MAC forwarding table or MAC forwarding database) is used to determine how to forward an incoming packet. Upon receiving a packet, the network element uses the destination MAC address (MAC) associated with that packet to lookup a bridge interface from the MAC forwarding data structure. The bridge interface indicates which network interface (I/F) the network element should use to forward the packet. One such implementation of a MAC forwarding data structure uses a hash table to store key-value pairs in which the key is the MAC associated with the incoming packet and the value is I/F to forward packets for that MAC. As packets come in, an I/F is retrieved from the MAC forwarding data structure for the associated MAC. If, the MAC forwarding data structure does not have an entry for that MAC then the network element can learn which bridge interface should be used for a given MAC and an entry can be created. This MAC-I/F pair is then inserted into the MAC forwarding data structure. If the network element handles 100 gigabits per second at minimum sized packets it handles approximately 150 million packets per second and the number of lookups is 150 million packets per second since the MAC forwarding data structure is consulted on every packet. However, typical rates for learning MAC-I/F associations (insertions) or deleting old associations are in the neighborhood of 100,000 per second. Thus, lookups occur at a rate of about 1000 times as often as insertions or deletions.

A hash table is a lookup data structure used to store key-value pairs that are indexed using the key. Hash tables strive to provide lookup and storage algorithms that always carry out with the same execution cost; this is referred to in big-O notation as O(1). Big-O, O(x), notation is used to denote cost of operations where x denotes the dominant factor that determines the cost. For example, if the cost of the lookup operation is A*n+B where n is the number of entries in the data structure then the lookup cost can be expressed as O(n). O(1) indicates a constant cost of the operation. Hash tables are generally chosen when the number of possible keys is much greater than the number of key-value pairs expected to be stored at any given time. In the case where the number of key-value pairs is of the same order of magnitude as the number of possible keys than a simple array implementation indexed by the key provides O(1) lookup and O(1) storage cost.

A hash table is implemented along the following lines. A hash function takes a key and generates a hash value (also referred to as hash index). In general, a hash function is a many-to-one function in the sense that the hash function will generate the same hash index for many keys. In this way, the hash function maps a larger key space into a smaller hash index space. The choice of which hash function to use is driven by how well the keys are distributed across the different hash indexes. The hash index is then used to index an array of hash buckets, each storing a key-value pair or linking to another data structure. Since the hash function is a many-to-one function, multiple key-value pairs (e.g. key1-value1 and key2-value2) can map to the same hash index and the same corresponding hash bucket. This is termed a hash collision.

Hash collision resolution refers to how the hash collisions are handled when they occur. With hash collisions, it is no longer sufficient to just compute the hash index from a given key. Instead, the further work must be done to differentiate between the multiple keys that can hash into the same bucket.

One class of hash collision resolution techniques, termed open addressing, involves checking alternate locations in the hash table until an empty slot in the array is found. In open addressing, the first tier hash table buckets do not contain lower tier hash tables. Each of the individual open addressing schemes differs in how the series of alternate locations in the array are picked for probing. However, in all such schemes the number of additional probes is not deterministic and therefore the lookup cost is not O(1).

Another class of hash tables involves constructing secondary data structures (such as a linked list, height balanced tree, or even another hash table) that hang from each hash bucket in the first tier hash table. The colliding key-value pairs are placed into the secondary data structure according to the algorithms associated with that data structure. In the case of a link list, the secondary data structure must be traversed until the given key is found and since the key-value pair may be first in the linked list or last in the linked list the total lookup cost is non-deterministic. In general, the cost of storage and lookup depends on the secondary data structure and therefore the associated costs are not necessarily O(1).

Most hash table implementations try to optimize the cost for all hash table operations: 1) insertion of a new key-value pair, 2) lookup of a key-value pair, and 3) deletion of a key-value pair. However such generic solutions are not well suited for use in a networking application which is lookup intensive.

SUMMARY OF THE INVENTION

Embodiments of the invention include a method performed in a network element including a media access control (MAC) forwarding control module that looks up MAC address and interface (I/F) identifier pairs (MAC-I/F pairs) stored in a MAC forwarding data structure. The network element receives at a physical port of the network element a packet that was sent by another network element that includes a MAC address to lookup in the MAC forwarding data structure. The MAC forwarding control module generates a first tier hash index from the received MAC address with a first hash function. The MAC forwarding control module then accesses a first tier bucket in a first tier data structure. The first tier bucket is located at the first tier hash index in the first tier data structure. The MAC forwarding control module determines the contents of the first tier bucket. In the case that the first tier bucket contains null, the MAC forwarding control module returns null. In the case that the first tier bucket contains one of the MAC-I/F pairs, the MAC forwarding control module determines if the MAC address of the MAC-I/F pair matches the received MAC address and returns the retrieved MAC-I/F pair's interface identifier if there is a match, the interface identifier identifies an interface within the network element to which the packet should be forwarded, or null if there is not a match. In the case that first tier bucket contains an address to a second tier bucket and a mask bit list, the MAC forwarding control module looks up the MAC address in the second tier data structure at the second tier data structure address. The MAC forwarding control module generates a second tier hash index from the MAC address and the mask bit list and then accesses a second tier bucket at the second tier hash index in the second tier data structure. The MAC forwarding control module determines the contents of the second tier bucket. In the case that the second tier bucket contains null, the MAC forwarding control module returns null. In the case that the second tier bucket contains one of the stored MAC-I/F pairs, the MAC forwarding control module determines if the MAC address of the MAC-I/F pair matches the received MAC address. The MAC forwarding control module retrieves the MAC-I/F pair from the second tier bucket and compares the received MAC address to the retrieved MAC-I/F pair's MAC address. In the case that the received MAC address matches the retrieved MAC-I/F pair's MAC address, the MAC forwarding control module returns the MAC-I/F pair. In the case that the received MAC address does not match the retrieved MAC-I/F pairs MAC address, the MAC forwarding control module returns null. In this way a MAC-I/F pair lookup requires, at most, two memory accesses because the second tier lookup is a deterministic lookup with only a single memory access.

Embodiments of the invention include a method performed in a network element including a media access control (MAC) forwarding control module that inserts MAC address and interface (I/F) identifier pairs into a MAC forwarding data structure utilizing compressed keys to index second tier data structures. The MAC forwarding data structure comprising a first tier data structure and a second tier data structure, the second tier data structure containing a plurality of MAC-I/F pairs. The MAC forwarding control module receives a first MAC-I/F pair to insert in the MAC forwarding data structure and determines a destination location for the first MAC-I/F pair in the second tier data structure. The MAC forwarding control module determines the contents of the destination location in the second tier data structure. In the case that the destination location contains a null, the MAC forwarding control module inserts the first MAC-I/F pair into the destination location. In the case that the destination location contains one of the plurality of MAC-I/F pairs, the MAC forwarding control module generates a new mask bit list and a new second tier data structure. The new mask bit list is generated from the first MAC-I/F pair and the plurality of MAC-I/F pairs in the second tier data structure. The new second tier data structure is generated to comprise the first MAC-I/F pair and the plurality of MAC-I/F pairs. The MAC forwarding control module updates the first tier data structure with an address to the new second tier data structure. In this way, a MAC forwarding data structure is constructed such that subsequent lookups will deterministically require, at most, two memory accesses to retrieve a value of a desired MAC-I/F pair or a null value.

Embodiments of the invention include a network element, to be coupled to a network, configured to receive packets from other network elements of the network and configured, process those packets, and maintain a media access control (MAC) address and interface (I/F) (MAC-I/F) forwarding data structure for determining the destination I/F of received packets. The network element comprising a plurality of I/Fs, a processor coupled to the plurality of I/Fs, a MAC forwarding control module coupled to the process, and a memory coupled to the processor and the MAC forwarding data structure control module. The plurality of I/Fs configured to receive packets from other network elements of the network, each packet comprising a destination MAC address. The processor configured to process the received packets and transmit the processed packets through different ones of the plurality of I/Fs to the processed packets destinations. The memory is configured to store the MAC forwarding data structure. The MAC forwarding control module configured to maintain a MAC forwarding data structure that includes a first tier data structure and a plurality of second tier data structures. The MAC forwarding control module further configured to associate MAC addresses with a corresponding forwarding I/F. The MAC forwarding control module comprises a compressed key lookup module, a MAC-I/F associated module, and a compressed key insert module. The compressed key lookup module configured to receive a first MAC address to lookup a MAC-I/F pair from the MAC forwarding data structure. The compressed key lookup module generates a first hash index from the first MAC address with a first hash function and retrieves contents of a first tier bucket from a location in the first tier data structure corresponding with the first tier hash index. The compressed key lookup module determines the contents of the first tier bucket. When the first tier bucket contains null, the compressed key lookup module returns nulls. When the first tier bucket contains a MAC-I/F pair corresponding to the first MAC address, the compressed key lookup module returns the first MAC address. When the first tier bucket contains an address to one of the plurality of second tier data structures and a mask bit list, the compressed key lookup module looks up the MAC-I/F pair from the one of the plurality of second tier data structures using a second tier hash index generated from the MAC address and the mask bit list. The MAC-I/F association module is configured to learn which of the plurality of I/Fs is associated with each of the received packets' destination MAC address. The compressed key insert module is configured to receive a first MAC-I/F pair to insert into the MAC forwarding data structure and generate a first tier hash index from the MAC address of the first MAC-I/F pair. The compressed key insert module further configured to determine the contents of a first tier bucket at a location in the first tier data structure corresponding with the first tier hash index. When the contents of the first tier bucket are null, inserting the MAC-I/F pair in the first tier bucket. When the contents of the first tier bucket are a second MAC-I/F pair, generating a mask bits list from the first MAC-I/F pair and the second MAC-I/F pair; generating a second tier data structure; inserting the first MAC-I/F pair and the second MAC-I/F pair into the second tier data structure; and inserting an address to the second tier data structure and mask bit list in the first tier bucket. In this way, a MAC forwarding data structure is constructed such that subsequent lookups will deterministically require, at most, two memory accesses to retrieve a value of a desired MAC-I/F pair or a null value.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The invention may best be understood by referring to the following description and accompanying drawings that are used to illustrate embodiments of the invention. In the drawings:

FIG. 2 is a block diagram illustrating a MAC forwarding data structure using compressed keys to index secondary data structures in the MAC forwarding data structure according to embodiments of the invention.

FIG. 4 is a block diagram illustrating the generation of a mask bit list used to generate compressed keys according to embodiments of the invention.

DETAILED DESCRIPTION

Figure 1:
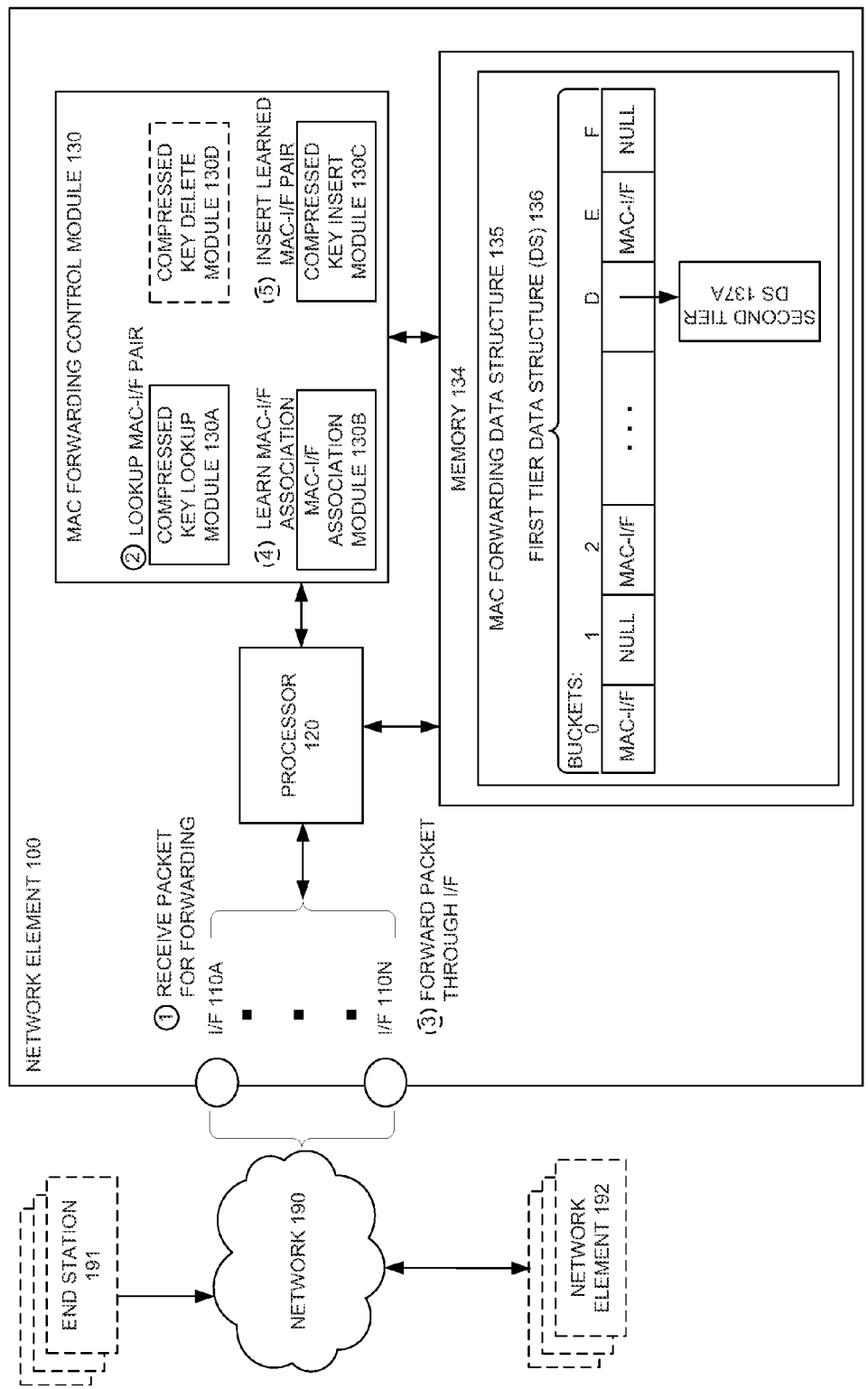
FIG. 1 is a block diagram illustrating a network element using a compressed key hash table control module to maintain a MAC forwarding data structure according to embodiments of the invention.

The following description describes methods and apparatus for maintaining a MAC forwarding data structure. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As described, MAC-I/F lookups from a MAC forwarding data structure occur at a rate about 1000 times as often as an insertion or deletion. Therefore, optimization of a MAC forwarding data structure to minimize lookup cost is highly favorable. One optimization is to use key compression to resolve hash collisions during a MAC-I/F lookup. As multiple MAC-I/F pairs are inserted into the MAC forwarding data structure, some MAC-I/F pairs are added to the same bucket in a first tier data structure. The MACs that map to the same bucket of a first tier data structure are all different from each other in at-least one bit position (more than one bit in most cases). Thus, a mask bit list of the differing bit positions for all MACs in the same first tier bucket can be constructed and applied against a given MAC to obtain a compressed key for a second tier data structure containing those MAC-I/F pairs. The total cost of a lookup using the compressed key technique is, at most, two lookups; that is one lookup for the first tier data structure and, if necessary, a second lookup into the second tier data structure with the compressed key (also referred to as a second tier hash index). Thus, the total cost of a lookup with the compressed key technique is deterministic and, therefore, $O(1)$.

FIG. 1 is a block diagram illustrating a network element using a compressed key hash table control module to maintain a MAC forwarding data structure according to embodiments of the invention. This figure includes modules and elements that are optional depending on the specific implementation and shown in dashed boxes. In FIG. 1, a network element 100 is coupled to a network 190. In one embodiment, the network element 100 is coupled to a plurality of end stations (such as subscriber end stations or server end stations) 191 through the network 190. In another embodiment, the network element 100 is coupled to a plurality of other network elements 191 through the network 190. In yet another embodiment, the network element is coupled to a plurality of end stations 191 and a plurality of network elements 192 though the network 190. The first network element 100 is comprised of a plurality of I/Fs 110A-110N which are coupled to a processor 120. The processor 120 is further coupled to a MAC forwarding control module 130 and a memory 134. The memory stores a MAC forwarding data structure 135. In one embodiment the memory is RL-DRAM (reduced-latency dynamic random access memory). Another embodiment may use other types of memory (e.g., eDRAM (embedded dynamic random access memory)). While other embodiments utilize DDR-DRAM (double date rate dynamic random access memory) or SDR-DRAM (single date rate dynamic random access memory).

In FIG. 1, the MAC forwarding data structure 135 comprises a first tier data structure 136 and a second tier data structure 137A. In exemplary fashion, the first tier data structure 136 comprises 16 buckets which each contain a MAC-I/F pair, a NULL entry, or an address to a second tier data structure along with a mask bit list. For example, buckets 0, 2, and E are each shown as containing a MAC-IF pair while bucket D is shown containing an address pointing to a second tier data structure 137A.

The MAC forwarding control module 130 comprises a compressed key lookup module 130A, a MAC-I/F association module 130B, and a compressed key insert module 130C. In one embodiment, the MAC forwarding control module 130 further comprises a compressed key delete module 130D. In one embodiment, the MAC forwarding control module 130 is specialized hardware logic that is coupled to the processor 120 while in other embodiments the forwarding control module 130 is a series of instructions that are processed by the processor 120 to implement similar functionality.

In FIG. 1, 5 points of processing an incoming packet in the network element 100 are shown, some of which are optional and shown with dashed markings. At point 1, an incoming packet is received for forwarding at network element 100 on a first I/F 110A. At point 2, the compressed key lookup module 130A within the MAC forwarding control module 130 looks up a MAC-I/F pair corresponding to a destination MAC found within the received packet. In the event that a MAC-I/F pair exists within the MAC forwarding data structure 135 corresponding to the destination MAC, the packet is forwarded out the associated I/F, which is shown in FIG. 1 as I/F 110N at point 3. In the event that MAC-I/F pair does not exists within the MAC forwarding data structure 135 corresponding to the destination MAC, then the MAC-I/F association module 130B learns which of the plurality of I/Fs 110A-110N are associated with destination MAC. One well known method of learning a MAC-I/F association is to forward the packet out I/Fs 110B-110N, all of the I/Fs 110A-110N other than the interface through which the packet was received, in this case 110A. Since the Ethernet protocol has a built-in acknowledgement system the network element 100 will eventually receive an acknowledgment packet on one of the I/Fs 110B-110N and the received I/F will be associated with the destination MAC. This is a technique is discussed in detail in the IEEE 802.1 standard. In response to learning the MAC-I/F association, the compressed key insert module 130C inserts the MAC-I/F pair into the MAC forwarding data structure 135. The operation of the MAC forwarding control module 130 is further understood with reference to later figures.

FIG. 2 is a block diagram illustrating a MAC forwarding data structure using compressed keys to index secondary data structures in the MAC forwarding data structure according to embodiments of the invention. The figure illustrates two points, A and B, during the use of the MAC forwarding data structure 135. Point A illustrates the MAC forwarding data structure 135 after five MAC-I/F pairs have been inserted. In the figure, the inserted MACs are listed in hexadecimal format enclosed in brackets and the I/F corresponding with the inserted MACs are not shown. The MACs shown in the figures have been simplified for illustration purposes and are only exemplary. Thus, the MACs are illustrated as one byte with 256 (0x00-0xFF) possible MACs. However, one of ordinary skill in the art would recognize that MACs are typically 6 bytes and that the one byte representation is used merely exemplary.

In FIG. 2, there are only 16 (0x0-0xF) buckets in a first tier data structure 136 of the MAC forwarding data structure 135. A simple exemplary hash function is used to generate the first tier hash index for each inserted key. This hash function uses the four most significant bits (the upper half) of the key to generate a first tier hash index. Thus, key [0F] corresponds with first tier hash index 0, key [29] corresponds with first tier hash index 2, key [E7] corresponds with first tier hash index E, key [D2] corresponds with first tier hash index D, and key [DF] corresponds with first tier hash index D. In one embodiment, a modified CRC function is used to generate the first tier hash index. In another embodiment cryptographic hash function is used to generate the first tier hash index. It would be well understood by one skilled in the art that the hash function used to generate the first tier hash index is largely dependent upon the expected set of keys that will be used in that hash table. Further, any number of algorithms and functions may be used to generate the first tier hash index and often these are selected depending upon the optimizations required for that specific hash table.

At point A, the compressed key hash table has the first tier data structure 136 represented with a key column, 0x0-0xF, and a bucket column. In one embodiment, each first tier bucket contains one of three entries: a NULL entry, a MAC-I/F pair entry, or a mask bit list and address to a secondary data structure. In another embodiment, the same entries are required for each first tier bucket except that rather than storing a mask bit list, a bitmask is stored along with an address to a second tier data structure. Furthermore, in another embodiment the mask bit list or bitmask is stored within the second tier data structure rather than in the bucket in the first tier data structure.

At point A of FIG. 2, the bucket entry for hash index 0 contains the MAC-I/F pair for the inserted [0F] key, the bucket entry for hash index 2 contains the MAC-I/F pair for the inserted [29] key, the bucket entry for hash index E contains the MAC-I/F pair for the inserted [E7] key, and the bucket entry for hash index D contains an address to an index D-second tier data structure 137A and a mask bit list used to generate the compressed key for lookups into the secondary data structure 137A. The remaining buckets contain NULL entries indicating that nothing has been stored for keys that would generate a first tier hash index corresponding to those buckets.

The MAC forwarding data structure has the index D-second tier data structure 137A stored in memory at the location addressed by an address stored in the first tier bucket D. The index D-second tier data structure 137A is an array that is index via the compressed key. The second tier data structure 137A array must be capable of storing the number of buckets that can be indexed by the compressed key. Each bucket entry in the second tier data structure will store either a NULL entry or a MAC-I/F pair. At point A, the mask bit list corresponding with index D has 1 bit position, bit position 4 (as listed from left to right), capable of indexing $2^1$ buckets. Thus, the index D-second tier data structure 137A must be capable of storing two buckets, one indexed by 0 and another indexed by 1. In embodiments utilizing a bitmask rather than a mask bit list, the corresponding 8 bit bitmask is 00001000. Using the mask bit list, a second tier hash function is used to generate a second tier hash index from the desired key. At point A, two MAC-I/F pairs created a hash collision with regards to the bucket stored at index D, key [D2] and key [DF]. The mask bit list was determined to require 1 bit position, which was bit position 4. Therefore, using only the value of each key at bit 4, the compressed key hash table can index the index D-second tier data structure 137A array using [D2] and [DF]. For the MAC-I/F pair with [D2] as the key, bit position 4 has a 0 and is therefore stored in the 0 bucket of the second tier data structure 105. For the MAC-I/F pair with [DF] as the key, bit position 4 has a 1 and is therefore stored in the 1 bucket of the second tier data structure 137A.

At point B of FIG. 2, the MAC forwarding data structure 135 is shown with five additional MAC-I/F pairs inserted, the keys of the MAC-I/F pairs (shown in bold in FIG. 1) are: [32], [60], [EE], [DC], and [DD]. As with point A, the first tier hash function is a simplified hash function merely using the four most significant bits of the inserted MAC to index a first tier hash bucket. Thus, the MAC-I/F pair [32] is inserted into the bucket entry for hash index 3, the MAC-I/F pair [60] is inserted into the bucket entry for hash index 6, the MAC-I/F pair [EE] is inserted into the bucket entry for hash index E, and the MAC-I/F pairs [DC] and [DD] are inserted in to the bucket entry for hash index D. No further action is required for the buckets for hash indexes 3 and 6 since those buckets previously contained null values. However, the bucket entries for hash index E and D both require additional processing to resolve hash collisions.

With respect to the insertion of [EE] into the bucket entry at index E, the bucket entry previously contained the MAC-I/F pair with [E7] as a MAC. Therefore [EE] and [E7] now present a hash collision at the E index of the first tier data structure 136. To resolve this, a second tier data structure 137C is created and a corresponding mask bit list is generated. The address to the second tier data structure 137C and the bit mask list is stored in the bucket entry at index E. In this case, the first bit, moving from most significant to least significant, that is different between the two keys, [E7] and [EE], is bit position 4. In embodiments utilizing a bitmask rather than a mask bit list, the corresponding 8 bit bitmask is 00001000. Thus, in the second tier data structure 137C array, the [E7] MAC-I/F pair is stored at hash index 0 and the [EE] MAC-I/F pair is stored at index 1 as corresponding with the value of the MACs at bit position 4.

With respect to the insertion of [DC] and [DD] into the bucket entry at index D, the previously existing second tier data structure 137A was capable of storing two keys and was previously storing the [D2] and [DF] MAC-I/F pair. However, with the addition of the [DC] and [DD] MAC-I/F pairs, a new second tier data structure 137B must be constructed with and a new mask bit list must be generated. The generation of new second tier data structures and mask bit list is further described with reference to FIG. 3 and FIG. 4. At point B of FIG. 2, the second tier data structure 137B contains the [D2] MAC-I/F pair at index 010, the [DC] MAC-I/F pair at index 100, the [DD] MAC-I/F pair at index 101, and the [DF] MAC-I/F pair at index 111. The remaining buckets contain NULL entries and the mask bit list is {4, 6, and 7}, this corresponds to a bitmask of 00001011 for embodiments utilizing a bitmask rather than the mask bit list.

One of ordinary skill in the art would recognize that although the embodiments of the invention are described with reference to a MAC forwarding data structure, it would be trivial to modify the methods and embodiments to create and use a general key-value pair hash table. Thus, another embodiment of the invention is a MAC forwarding table using a 6 byte MAC address along with a 2 byte Bridge Table ID as the key into a compressed key hash table that has values identifying associated bridge interfaces. Another embodiment is of an internet protocol (IP) Subscriber Lookup using a 4 or 16 byte IP source address (depending on whether it is IPv4 with 4 bytes or IPv6 with 16 bytes) along with a 2 byte Input Interface Id as the key into a compressed key hash table that has values associated with subscriber information. Another embodiment is of an IP Flow Table using IP source address, IP destination address, protocol, source port, and destination port combined as 13 or 37 byte key into a compressed key hash table that has values associated with Flow Information. It would be well understood by those skilled in the art that a compressed key hash table of the embodiments may be used in many situations in which a deterministic lookup cost is a priority for optimizing a hash table. Thus, in other embodiments more or less bytes can be used depending on the specific key-value pair being stored in the compressed key hash table.

Figure 3:
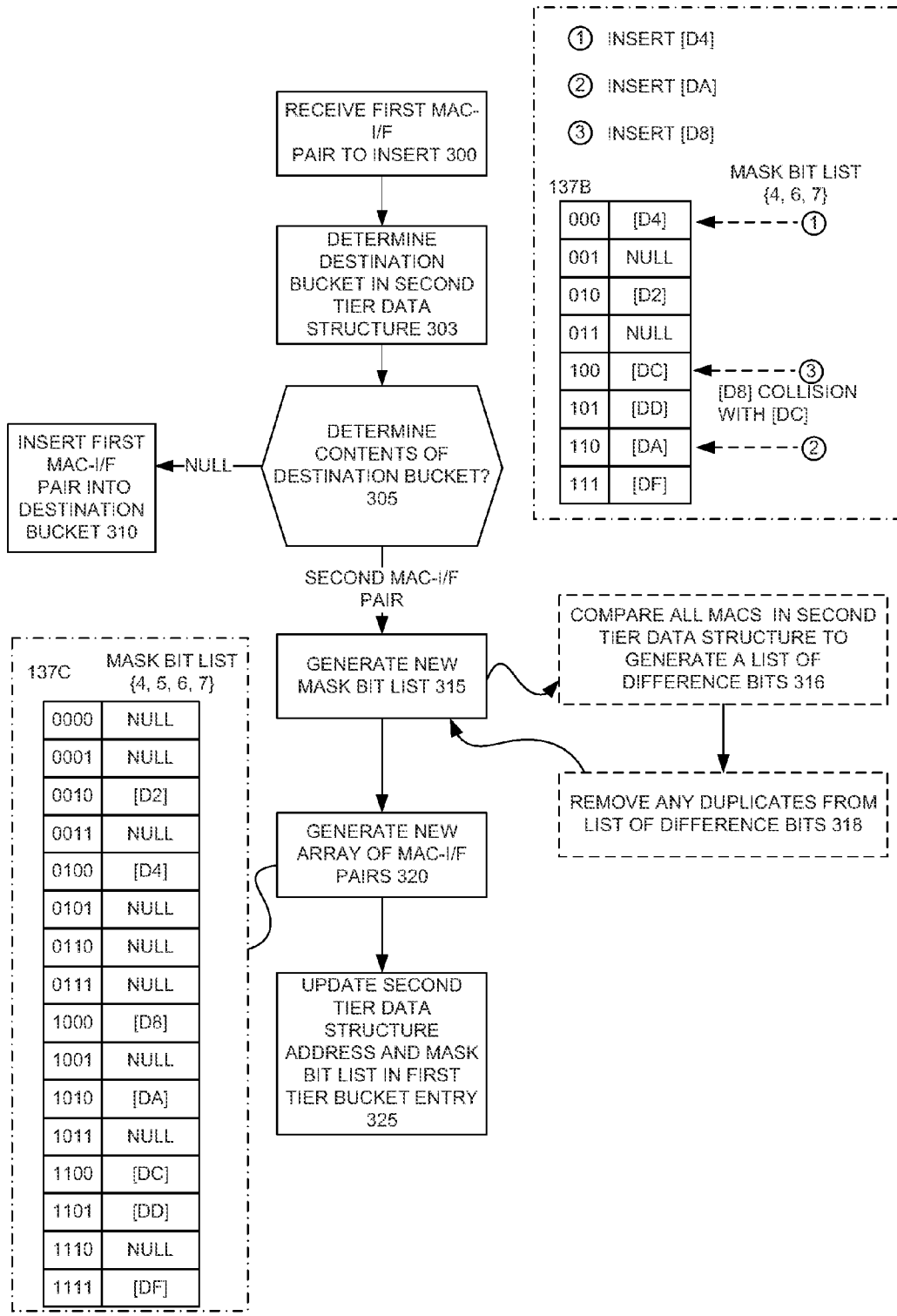
FIG. 3 is a flow chart illustrating a method for inserting a MAC-I/F pair into a second tier data structure of a MAC forwarding data structure according to embodiments of the invention.

FIG. 3 is a flow chart illustrating a method for inserting a MAC-I/F pair into a second tier data structure of a MAC forwarding data structure according to embodiments of the invention. The compressed key insert module 130C uses the method described in FIG. 3 to insert MAC-I/F pairs into the second tier data structures of the MAC forwarding data structure 135. The method starts in block 300 with receiving a first MAC-I/F pair to insert. In this method, it is assumed that a key collision occurred in the first tier data structure between the MAC in the MAC-I/F pairs and one or more MACs already in the compressed key hash table. The method continues at block 303 with determining a destination bucket in an existing second tier data structure. The existing second tier data structure is the data structure addressed in bucket entry of the first tier data structure that is indexed by the first tier hash index generated with the MAC of the MAC-I/F pair being inserted. The method then determines the contents of the destination bucket at block 305. If the contents of the destination bucket are NULL, or a NULL entry, the method continues at block 310 by inserting the first MAC-I/F pair into the destination bucket. If the destination bucket contains a second MAC-I/F pair, then the method continues with generating a mask bit list at 315.

The steps 316 and 318 are one embodiment for generating a new mask bit list, thus shown in dashed boxes as optional. At block 316, all keys in the second tier data structure are compared to generate a list of difference bits. The generation of difference bits is further described with reference to FIG. 4. At block 318, the list of difference bits 318 is inspected for duplicate bit positions and any duplicates are removed from that list. The result of these two blocks is a new mask bit list. Other embodiments of block 315 may be generate a list of least significant (right most) bit positions or generate a bit mask of equal length to the compared keys and place a bit value of 1 in the positions to use in the compressed key.

The keys of the MAC-I/F pairs in the existing second tier data structure, the key of the MAC-I/F pair being inserted, and the new mask bit list are used in block 320 to create a new array of MAC-I/F pairs that will be used as a new second tier data structure to replace the existing second tier data structure. The bucket entry in the first tier data structure indexed by the first tier hash index corresponding to the keys in the new second tier data structure 330 is then updated with the address to the new second tier data structure 330 and new mask bit list {4, 5, 6, 7}.

The method can be further explained with reference to inserting three MAC-I/F pairs with keys [D4], [DA], and [D8] into the second tier data structure 137B of FIG. 1. The second tier data structure 137B is shown in a dashed-dotted box at the top right of the figure along with the mask bit list prior to the insertion of the three new MAC-I/F pairs. In FIG. 3, the second tier data structure 137B is shown with two new MAC-I/F pairs ([D4] and [DA]) inserted and a third MAC-I/F pair ([D8]) that collides with an existing MAC-I/F pair.

When the [D4] MAC-I/F pair is inserted first in FIG. 2, the first tier hash function indexes the D index bucket entry from point B of FIG. 1. This bucket entry points to the second tier data structure 137B and has a corresponding mask bit list of {4, 6, 7}. Using the key [D4], which is 11010100 in binary, along with the mask bit list of {4, 6, 7} the second tier hash index can be computed. The first bit (most significant bit) of the second tier hash index is taken from bit position 4 of the key [D4], where bit position 0 is the most significant bit (leftmost) and bit position 7 is the least significant bit (rightmost). The second bit of the second tier hash index is taken from bit position 6 and the third bit of the second tier hash index is taken from bit position 7. Thus, the second tier hash index corresponding with mask bit list {4, 6, 7} and key 11010100 is 000. Since the second tier data structure 137B contained a NULL entry at index 000, the [D4] MAC-I/F pair can be inserted into the second tier bucket at index 000 without further processing. Likewise, no additional processing is required for the second MAC-I/F pair insertion of FIG. 3, insertion of a [DA] MAC-I/F pair, since the mask bit list {4, 6, 7} and key [DA], 11011010 in binary, generates an index of 110 with a NULL entry in the corresponding bucket entry.

However, during the insertion of the third MAC-I/F pair of FIG. 3, insertion of a [D8] MAC-I/F pair, a collision between the [D8] MAC-I/F pair and the [DC] MAC-I/F pair occurs. The mask bit list {4, 6, 7} and the keys [D8], 11011000, and [DC], 11011100, both result in a second tier hash index of 100. (As shown with the bolding and underlining of the bits of the key in the bit positions corresponding to the mask bit list.) Thus, without further processing, both MAC-I/F pairs cannot be stored in the second tier data structure 137B. Therefore, a new mask bit list must be created for the MAC-I/F pairs stored in the first tier hash index D second tier data structure. One embodiment of generating a mask bit list 315, embodying steps 316 and 317, is described with reference to FIG. 4.

FIG. 4 is a block diagram illustrating the generation of a mask bit list used to generate compressed keys according to embodiments of the invention. In this figure, there are seven MAC-I/F pairs in a second tier data structure and therefore seven MACs that are compared against each of the others of the seven MACs. This is illustrated with six sets of comparisons being made, sets A-F. In each set of comparison, one source MAC (shown at the top of the list of MACs) is being compared with the other MACs which follow below the source MAC. Each MAC is illustrated as eight bits, split into groups of four to allow for clearer demarcation of the bit positions. Above the source MAC for each set A-F, the figure shows that the bit positions are ordered 0-7 with 0 being the most significant (left most) bit.

In this embodiment, each bit of the MACs are compared from left to right and the bit position of the first bit that differs in the other MAC, as compared to the source MAC for that set, is noted for inclusion in the mask bit list. In set A of FIG. 4, MAC [D2] is compared against six other MACs: [DC], [D4], [D8], [DD], [DA], and [DF]. As shown in set A of FIG. 4, bit 4 is the first position of difference between the source MAC [D2] and five of the six other MACs: [DC], [D8], [DD], [DA], and [DF]. Further bit 5 is the first bit position of difference between source MAC [D2] and MAC [D4]. Therefore, the mask bit list (prior to the removal of duplicate bit positions) is {4, 5, 4, 4, 4, 4}, this is shown with bolded bit positions in FIG. 4. Duplicates in this list are removed so that the mask bit list as generated during the comparison of [D2] with the other MACs is {4, 5}. In this way, the contents of the seven MACs at bit positions 4 and 5 can distinguish the source MAC [DC] from the other MACs in second tier data structure. More specifically, the value of the compressed key for source MAC [D2] using a mask bit list of {4, 5} is 00 (values from positions 4 and 5 concatenated with the first bit position in the list being the most significant bit of the compressed key) and no other compressed key in the second tier data structure using a mask bit list of {4, 5} will be 00.

This is not to say that others of the MACs in the second tier data structure can be uniquely addressed with a mask bit list of {4, 5} in this embodiment. Rather, additional comparisons for sets B-F are performed to determine the mask bit list for subsequent MACs. In the illustrated embodiment for each subsequent set B-F, the previously compared MAC is excluded from the comparison as that MAC was previously compared with all the other MACs in the second tier data structure. In other embodiments, the source MAC for each set will be compared against all other MACs in the second tier data structure regardless of previous comparison. Still other embodiments will perform all comparisons of each of the MACs in the second tier data structure with all of the MACs in that second tier data structure as one set of comparisons.

For set B, the source MAC is [DC] and the generated mask bit list is {4, 5, 7, 5, 6} which may be reduced to {4, 5, 7, 6} with duplicates removed. Further, it is advantageous in some embodiment to reorder the mask bit list such that the most significant bits appear first in the list which would render a mask bit list for set B as {4, 5, 6, 7}. For set C, the source MAC is [D4] and the reduced mask bit list is {4}. For sets D (MAC [D8]) and E (MAC [DD]), the reduced mask bit list is {5, 6}, and the mask bit list is {5} for set F (MAC [DA]). No set of comparisons is shown with MAC [DF] as the source MAC merely because MAC [DF] was compared with all other MACs through the previous sets A-F of comparisons.

By combining the generated mask bit list from each set A-F, namely mask bit lists: {4, 5}, {4, 5, 6, 7}, {4}, {5, 6}, {5, 6}, and {5} a mask bit list is generated that allows for the generation of compressed keys that will uniquely address each MAC in the second tier bucket. Combined, the mask bit list is {4, 5, 4, 5, 6, 7, 4, 5, 6, 5, 6, and 5}. Again this list is reduced and reordered to {4, 5, 6, 7}. In another embodiment, the mask bit list generated at each set A-F is not reduced and reordered but rather the combined mask bit list is reduced and reordered which would render the same mask bit list for the combination of sets A-F. Using this combined mask bit list of {4, 5, 6, 7} each a compressed key can be generated for each of the MACs ([D2], [DC], [D4], [D8], [DD], [DA], and [DF]) such that each compressed key is unique to its corresponding MAC. Hence, the mask bit list and compressed key allows for a guarantee that no hash collisions will occur between MACs stored in that second tier data structure during a lookup of a MAC.

Referring briefly back to FIG. 3, In this embodiment, the new second tier data structure 137C contains seven MAC-I/F pairs with MACs: [D2], [DC], [D4], [D8], [DD], [DA], and [DF]. Using the mask bit list {4, 5, 6, 7}, the compressed keys corresponding with seven MACs are: [D2]=0010, [D4]=0100, [D8]=1000, [DA]=1010, [DC]=1100, [DD]=1101, [DF]=1111. Thus, the MAC-I/F pairs are stored in the bucket located at the second tier hash index corresponding with that MAC-I/F pair's compressed key. For example, since the mask bit list is {4, 5, 6, 7} and [D2] is hexadecimal for the binary value of 11010010, the least significant bits (bit positions 4, 5, 6, and 7) are used to generate a compressed key of 0010.

While FIGS. 3 and 4 have been described with reference to inserting a MAC-I/F pair into the MAC forwarding data structure 135, it should be recognized that similar steps may be used to delete a MAC-I/F pair from MAC forwarding data structure 135. In embodiments utilizing the compressed key delete module 130D, this method is used to delete MAC-I/F pairs from the MAC forwarding data structure 135. When presented with a specific MAC of a MAC-I/F pair to be deleted, embodiments of the invention can locate the bucket containing the desired MAC and remove the MAC from the determined bucket. In the case that the MAC-I/F pair is located in a second tier data structure, such as 137B, it may be desirable to generate a new mask bit list and new array of MAC-I/F pairs to replace that second tier data structure. This generation has the advantage of allowing the MAC forwarding control module 130 to recover unused space in memory by reducing the number of buckets available at that second tier data structure and allowing for an increase of the compressed key efficiency by determining that less or different bit positions can be used in the mask bit list. As such, steps 315, 320, and 325 may be used in a similar fashion in response to deleting a MAC-I/F pair from a second tier data structure. In one embodiment, the compressed key delete module 130D determines whether a space savings or efficiency gain is possible after the deletion and only performs corresponding steps 315, 320, and 325 if the desired effects will result. In other embodiments, the compressed key delete module 130D will allow for a given number of deletions to occur without regeneration and perform 315, 320, and 325 only after a threshold number of deletions occur to improve the likelihood that some efficiency gain will be occur through the regeneration of the second tier data structure.

Figure 5:
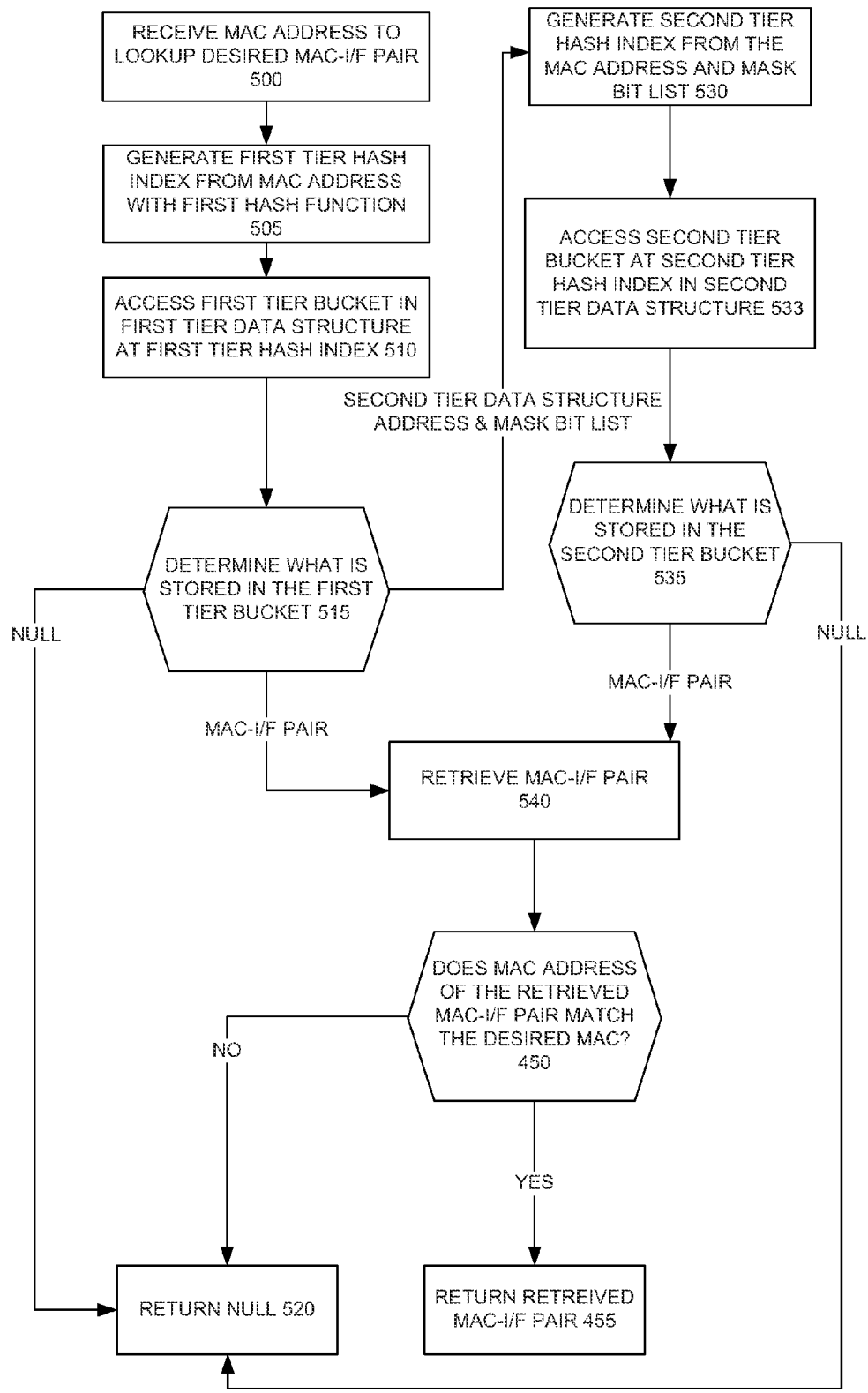
FIG. 5 is a flow chart illustrating a MAC lookup from a MAC forwarding data structure according to embodiments of the invention.

FIG. 5 is a flow chart illustrating a MAC lookup from a MAC forwarding data structure according to embodiments of the invention. The compressed key lookup module 130A uses the method described in FIG. 5 to lookup MAC-I/F pairs from the MAC forwarding data structure 135. In FIG. 5, it is assumed that a MAC forwarding database exists within a network element and that the MAC forwarding database contains a plurality of MAC-I/F pairs. The figure begins at block 500 at which a MAC address is received to lookup a MAC-I/F pair from the within the MAC forwarding database. A first hash function is used to generate a first tier hash index at block 505. The method continues at block 510 in which a first tier bucket in the first tier data structure is accessed. The first tier bucket is located at the first tier hash index generated in block 505. The method continues by determining what contents are stored in the first tier bucket at block 515. If the bucket contains a NULL entry, the method continues by returning NULL at block 520. If the bucket contains a MAC-I/F pair, then the method continues by retrieving the MAC-I/F pair at block 540. If the first tier bucket contains a second tier data structure address and mask bit list, then the method continues by generating a second tier hash index from the MAC address and the mask bit list at block 530.

In the case that method continues at block 530, a second tier hash index (compressed key) is generated according to the method described with reference to FIG. 3. This compressed key is used to access a second tier bucket located at the second tier hash index in the second tier data structure at block 533. The method continues by determining what contents are stored in the second tier bucket at block 535. If the bucket contains a NULL entry, the method continues by returning NULL at block 520. If the bucket contains a MAC-I/F pair, then the method continues by retrieving the MAC-I/F pair from at block 540.

In the case that the method reaches block 540, either from accessing the first tier bucket or accessing the second tier bucket, the method must verify that the MAC address of the retrieved MAC-I/F pair matches the MAC address being looked up. At the first tier bucket, hash collisions between two MACs means that an inserted MAC in the first tier bucket can match the same first tier hash index as the MAC addresses being looked up. If only one MAC is in the first tier bucket then the wrong MAC-I/F pair would be returned if the MACs were not compared prior to returning the MAC-I/F pair. At the second tier bucket, coming from block 535 to block 540, it is possible for two MACs to generate the same compressed key so long as both MACs do not exist within the second tier data structure. For example from FIG. 3, MACs [D8] and [DC] have the same compressed key when the mask bit list is {4, 6, 7}. Therefore, a lookup for [D8] when the second tier data structure contains [DC], but not [D8], and is using a mask bit list of {4, 6, 7} would return the MAC-I/F pair corresponding with [DC]. Therefore, coming from either block 515 or block 535, the method must check if the MAC of the retrieved MAC-I/F pair matches the MAC address being looked up at block 555. If the MAC address being looked up and the retrieved MAC address do no match, the method continues with returning a NULL entry at block 520 because the desired MAC was not located in the MAC forwarding database. If the MAC address being looked up and the retrieved MAC address do match, then the method continues with returning the retrieved MAC-I/F pair at block 555.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VoIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

For layer 2 forwarding, the network element can store one or more bridging tables that are used to forward data based on the layer 2 information in this data.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

ALTERNATIVE EMBODIMENTS

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a network element including a media access control (MAC) forwarding control module that looks up MAC address and interface (I/F) identifier pairs (MAC-I/F pairs) stored in a MAC forwarding data structure, the method comprising the steps of:
   receiving at a physical port of the network element a packet that was sent by another network element and that includes a MAC address to lookup in the MAC forwarding data structure;
   generating a first tier hash index from the received MAC address with a first hash function;
   accessing a first tier bucket in a first tier data structure at the first tier hash index;
   determining the first tier bucket's contents;
   in the case that the first tier bucket contains a null, returning a null;
   in the case that the first tier bucket contains one of the MAC-I/F pairs, retrieving the MAC-I/F pair from the first tier bucket, comparing the received MAC address to the retrieved MAC-I/F pair's MAC address and:
   in the case that the received MAC address matches the MAC-I/F pair's MAC address, returning the retrieved MAC-I/F pair's interface identifier, wherein the interface identifier identifies an interface within the network element to which the packet should be forwarded, and
   in the case that the received MAC address does not match the retrieved MAC-I/F pair's MAC address, returning null; and
   in the case that the first tier bucket contains a second tier data structure address and a mask bit list:
   generating a second tier hash index from the received MAC address and the mask bit list, accessing a second tier bucket in a second tier data structure, wherein the second tier data structure is stored at the second tier data structure address and the second tier bucket stored at the second tier hash index, determining contents of the second tier bucket, in the case that the second tier bucket contains a null, returning a null, in the case that the second tier bucket contains one of the stored MAC-I/F pairs, retrieving the MAC-I/F pair from the second tier bucket, comparing the received MAC address to the retrieved MAC-I/F pair's MAC address and:
   in the case that the received MAC address matches the retrieved MAC-I/F pair's MAC address, returning the retrieved MAC-I/F pair's interface identifier, wherein the interface identifier identifies an interface within the network element to which the packet should be forwarded, and
   in the case that the received MAC address does not match the retrieved MAC-I/F pair's MAC address, returning null;
   whereby each MAC-I/F pair lookup requires, at most, two memory accesses because the second tier lookup is a deterministic lookup with only a single memory access.

2. The method of claim 1, wherein the generation of the second tier hash index from the MAC address and the mask bit list comprises the steps of:
   initializing the second tier hash index to an empty value; and
   for each mask bit location in the mask bit list:
      retrieving a bit value from the MAC address corresponding to a bit specified by the current mask bit location, and
      appending the bit value to the second tier hash index.

3. The method of claim 1, wherein the first hash function is selected from one of: a modified cyclic redundancy check (CRC) function, a cryptographic hash function, and a checksum hash function.

4. A method performed by a network element including a media access control (MAC) forwarding control module that inserts MAC address and interface (I/F) identifier pairs (MAC-I/F pairs) into a MAC forwarding data structure utilizing compressed keys to index second tier data structures, the method comprising the steps of:
   receiving, at the MAC forwarding control module, a first MAC-I/F pair to insert into the MAC forwarding data structure, the MAC forwarding data structure comprising a first tier data structure and a second tier data structure, the second tier data structure containing a plurality of MAC-I/F pairs;

determining a destination location for the first MAC-I/F pair, the destination location in the second tier data structure;

determining contents of the destination location in the second tier data structure;

in the case that the destination location contains null, inserting the first MAC-I/F pair into the destination location;

in the case that the destination location contains one of the plurality of MAC-I/F pairs:
 generating a new mask bit list from the first MAC-I/F pair and the plurality of MAC-I/F pairs,
 generating a new second tier data structure comprising the first MAC-I/F pair and the plurality of MAC-I/F pairs, and
 updating the first tier data structure with an address to the new second tier data structure and the new mask bit list;

whereby a MAC forwarding data structure is constructed such that subsequent lookups will deterministically require, at most, two memory accesses to retrieve a value of a desired MAC-I/F pair or a null value.

5. The method of claim 4, wherein the generating a new mask bit list step comprises the steps of:
 adding the first MAC-I/F pair to the plurality of MAC-I/F pairs;
 for each MAC-I/F pair in the plurality of MAC-I/F pairs:
  comparing a first MAC address of the current MAC-I/F pair to each MAC address of each of the other MAC-I/F pairs in the plurality of MAC-I/F pairs to determine the left most bits that are different between the first MAC address and each of the other MAC addresses in the plurality of MAC-I/F pairs,
  compiling the new mask bit list with all of the bit positions that differ between each of the MAC addresses in the MAC-I/F pairs and each of the other MAC addresses in the plurality of MAC-I/F pairs, and
  removing all duplicates from the mask bit list.

6. The method of claim 5, wherein the step of generating a new second tier data structure comprises the steps of:
 creating a new array structure to store the plurality of MAC-I/F pairs; and
 for each MAC-I/F pair in the plurality of MAC-I/F pairs:
  generating a second tier hash index for the current MAC-I/F pair using the mask bit list and the MAC addresses of the current MAC-I/F pair, and
  inserting the current MAC-I/F pair into the array at the second tier hash index for the current MAC-I/F pair.

7. The method of claim 6, wherein the step of generating a second tier hash index for the current MAC-I/F pair comprises the steps of:
 initializing the second tier hash index to an empty value; and
 for each bit location in the mask bit list:
  retrieving a bit value for from a corresponding bit location in the MAC address of the current MAC-I/F pair, and
  appending the bit value to the second tier hash index.

8. A network element, to be coupled to a network, configured to receive packets from other network elements of the network, process those packets, and maintain a media access control (MAC) address and interface (I/F) (MAC-I/F) forwarding data structure for determining the destination I/F of received packets, the network element comprising:

a plurality of I/Fs configured to receive packets from other network elements of the network, each packet comprising a destination media access control (MAC) address;

a processor coupled to the plurality of I/Fs and configured to:
 process the received packets, and
 transmit the processed packets through different ones of the plurality of I/Fs to the processed packets destinations;

a MAC forwarding control module coupled to the processor and configured to maintain a MAC forwarding data structure that includes a first tier data structure, to store a plurality of second tier data structure addresses, and to associate MAC addresses with corresponding forwarding I/Fs, the MAC forwarding control module comprising:
 a compressed key lookup module configured to:
  receive a first MAC address to lookup a MAC-I/F pair from the MAC forwarding data structure,
  generate a first tier hash index from the first MAC address with a first hash function,
  retrieve contents of a first tier bucket from a location in the first tier data structure corresponding with the first tier hash index,
  determine the contents of the first tier bucket,
  return a null value when the first tier bucket's contents are null,
  return the retrieved MAC-I/F pair's interface identifier when the first tier bucket's contents are a MAC-I/F pair corresponding to the first MAC address, wherein the interface identifier identifies an interface within the network element to which the packet should be forwarded,
  lookup the MAC-I/F pair from one of the plurality of second tier data structures using a second tier hash index generated from the MAC address and a mask bit list associated with the one of the plurality of second tier data structures when the first tier bucket's contents are an address to the one of the plurality of second tier data structures and the mask bit list,
 a MAC-I/F association module configured to learn which of the plurality of I/Fs is associated with each of the received packets' destination MAC address, and
 a compressed key insert module configured to:
  receive a first MAC-I/F pair to insert into the MAC forwarding data structure,
  generate a first tier hash index from the MAC address of the first MAC-I/F pair,
  determine the contents of a first tier bucket at a location in the first tier data structure corresponding with the first tier hash index,
  when the contents of the first tier bucket are null, insert the first MAC-I/F pair in the first tier bucket, and
  when the contents of the first tier bucket are a second MAC-I/F pair:
   generate a mask bit list from the first MAC-I/F pair and the second MAC-I/F,
   generate a second tier data structure,
   insert the first MAC-I/F pair and the second MAC-I/F pair in the second tier data structure, and
   insert an address to the second tier data structure and the mask bit list in the first tier bucker; and
a memory coupled to the processor and the MAC forwarding data structure control module, the memory configured to store the MAC forwarding data structure;

whereby a MAC forwarding data structure is constructed such that subsequent lookups will deterministically require, at most, two memory accesses to retrieve a value of a desired MAC-I/F pair or a null value.

9. The network element of claim 8, wherein the compressed key insert module is configured to:
generate the mask bit list by comparing a first MAC address of the first MAC-I/F pair to with a second MAC address of the second MAC-I/F pair and storing first bit of difference between the first MAC address and the second MAC address; and
insert the first MAC-I/F pair and the second MAC-I/F pair in the second tier data structure by generating second tier hash indexes from the mask bit list and the MAC addresses of the MAC-I/F pairs, wherein the second tier hash indexes correspond to the value of the bits of the MAC addresses at the bit positions listed in the mask bit list.

10. The network element of claim 8, wherein the MAC forwarding control module further comprises a compressed key delete module configured to remove MAC-I/F pairs from the MAC forwarding data structure.

* * * * *

UNITED STATES PATENT AND TRADEMARK OFFICE
CERTIFICATE OF CORRECTION

| | | |
|---|---|---|
| PATENT NO. | : 8,312,066 B2 | Page 1 of 1 |
| APPLICATION NO. | : 12/957301 | |
| DATED | : November 13, 2012 | |
| INVENTOR(S) | : Jagannathan et al. | |

It is certified that error appears in the above-identified patent and that said Letters Patent is hereby corrected as shown below:

In Fig. 5, Sheet 5 of 5, in Box "455", in Line 1, delete "RETREIVED" and insert -- RETRIEVED --, therefor.

In Column 16, Line 32, in Claim 1, delete "M AC-I/F" and insert -- MAC-I/F --, therefor.

In Column 17, Line 58, in Claim 7, delete "for from" and insert -- from --, therefor.

In Column 19, Line 8, in Claim 9, delete "pair to" and insert -- pair --, therefor.

Signed and Sealed this
Nineteenth Day of February, 2013

Teresa Stanek Rea
*Acting Director of the United States Patent and Trademark Office*